United States Patent [19]

Coteus et al.

[11] Patent Number: 5,619,219
[45] Date of Patent: Apr. 8, 1997

[54] SECURE VIEWING OF DISPLAY UNITS USING A WAVELENGTH FILTER

[75] Inventors: Paul W. Coteus, Yorktown Heights, N.Y.; Douglas S. Goodman, Sudbury, Mass.

[73] Assignee: International Business Machines Corporation, Armonk, N.Y.

[21] Appl. No.: 342,950

[22] Filed: Nov. 21, 1994

[51] Int. Cl.$^6$ .................................................. G09G 5/00
[52] U.S. Cl. .................................... 345/7; 345/4; 380/54
[58] Field of Search ................................ 345/8, 7, 9, 4, 345/5, 6, 32; 348/42, 46, 51, 52, 53, 54, 55, 56, 57, 58, 59; 380/6, 7, 54, 59; 359/462, 464, 466

[56] References Cited

U.S. PATENT DOCUMENTS 2,832,821  4/1958  Du Mont .
3,621,127  11/1971 Hope .
3,991,266  11/1976 Baer .
4,122,484  10/1978 Tan .................................................. 348/42
4,424,529  1/1984  Roese et al. .
4,772,944  9/1988  Yoshimura .
4,859,994  8/1989  Zola et al. .
4,879,603  11/1989 Berman .
4,881,179  11/1989 Vincent .
5,107,443  4/1992  Smith et al. .

*Primary Examiner*—Richard Hjerpe
*Assistant Examiner*—Xiao M. Wu
*Attorney, Agent, or Firm*—Scully, Scott, Murphy & Presser

[57] ABSTRACT

Apparatus for masking a displayed image by merging it with a second featureless image made of a narrow band of wavelengths that is introduced into a transparent screen disposed between the display and the viewer. An absorption filter matched to the wavelength of the masking light separates or blocks the masking image to permit the primary image to be viewed only by the person having the filter.

9 Claims, 1 Drawing Sheet

SECURE VIEWING OF DISPLAY UNITS USING A WAVELENGTH FILTER

RELATED APPLICATIONS

The present invention is related to commonly assigned U.S. patent applications having Ser. Nos. 08/342,953 and 08/342,514, entitled SECURE VIEWING OF DISPLAY UNITS USING AN ELECTRONIC SHUTTER and SECURE VIEWING OF DISPLAY UNITS BY IMAGE SUPERPOSITION AND WAVELENGTH SEPARATION, respectively, filed concurrently herewith, which have identity of inventorship and which are incorporated herein by reference. The U.S. patent application Ser. No. 08/342,514 now was U.S. Pat. No. 5,537,476.

BACKGROUND OF THE INVENTION

1. Field of the Invention

The present invention is directed to video display security systems and more particularly to a system for optically masking a display image and selective removal of the mask for secure viewing of the display.

2. Discussion of the Prior Art

The widespread use of laptop computers has enabled users to access information in also any location. Often, information is retrieved during meetings or while traveling between destinations where many other people besides the user may view the display. A problem arises where the information displayed is confidential and should be seen only by the user.

While information security systems that provide various levels of security to multiple users on a network, such as that shown in U.S. Pat. No. 4,881,179, provide selected access to information, these systems do not protect unauthorized viewing of the information while it is being displayed.

U.S. Pat. No. 4,859,994 is directed to a system for providing selected viewing of a display to allow hearing impaired persons to view subtitles while others cannot see the subtitles. A liquid crystal display that produces the subtitles as polarized light can be seen only by viewers having polarized eyeglass lenses. Although selective viewing is provided, it is not secure viewing in that anyone having polarized sunglasses can see the information on the screen. In addition, the selectivity is not switchable in the event security is no longer required.

Thus, there is a need for a system for providing secure, selective viewing of information on a display that can be easily enabled and disabled by the viewer.

SUMMARY OF THE INVENTION

The present invention is directed to an apparatus for providing secure viewing of a primary image on a display by a viewer that includes means for generating an optical mask of light of a single wavelength band for the image and viewing means for separating the optical mask from the primary image. The optical mask is generated by a secondary image produced between the display and the viewer where the secondary image mixes with the primary image to obscure the viewing of the primary image. In order to see the primary image, the viewer must have the viewing means for removing the secondary image.

In one embodiment of the present invention, a screen is disposed between the display and the viewer and a mask of light is introduced into the interior of the screen. The screen is transparent to enable the mask of light to be seen by the viewer. The screen also does not distort the primary image on the display. The mask of light escapes from the front of the screen and mixes with the display image to obscure the display image. The mask of light is encoded with a particular narrow band of wavelengths that preferably is not one of the wavelengths used to generate the primary image. The primary image may be viewed through a filter designed to absorb the wavelength band of the masking light. The filter which may be provided as a pair of eyeglasses worn by the viewer blocks the mask of light and permits the viewer to see the primary image. The present invention has application not only in portable or other computer display terminals, but extends to any means of display using emitted light.

DETAILED DESCRIPTION OF THE INVENTION

Figure 1:
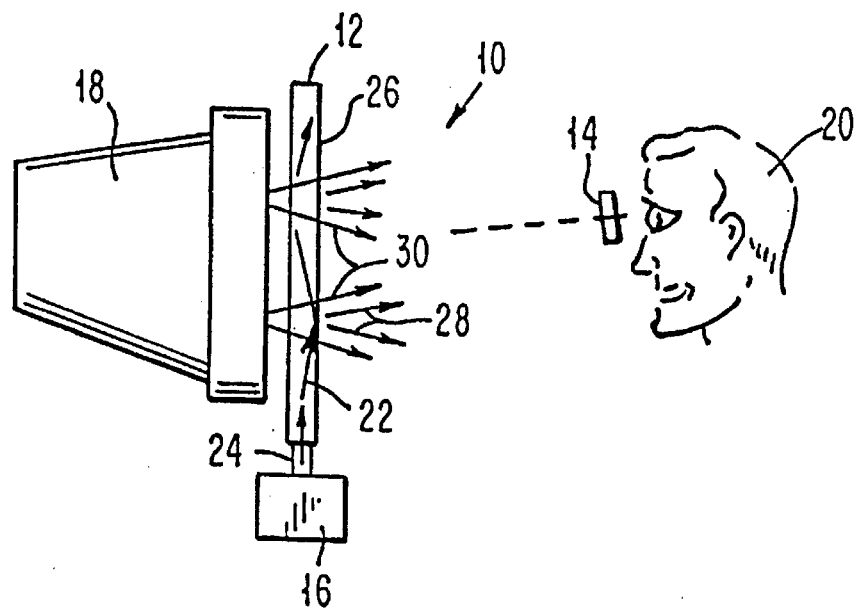
FIG. 1 is a schematic of the apparatus of the secure viewing display system in accordance with the present invention.

Referring now to the drawings, a schematic of the apparatus 10 of the present invention for providing secure viewing of display units is shown in FIG. 1. Apparatus 10 includes a thin, transparent sheet of material 12, an absorption filter 14, and a control means 16. The transparent sheet 12 is placed in front of the display 18 or other unit containing the image to be viewed. The control means 16 is optically coupled to the transparent sheet 12. The transparent sheet 12 and wavelength filter 14 are both positioned between the viewer 20 and the display 18.

The control means 16 generates light in a single narrow band of wavelengths depicted by rays 22 that are introduced into one or more edges of the sheet 12 through, for example, a light guide or other optical coupling means 24. Sheet 12 must be made of material that is thin enough so that it does not significantly distort the primary image to be viewed that is on the display 18. The light waves 22 travel through the sheet, with a fraction of the light 28 escaping from the front and back surfaces of the sheet 12. The light 28 escaping from the front surface 26 of the sheet 12 forms a mask of light that mixes with light 30 from the primary image to be viewed thereby obscuring the primary image. The rays 28 of the masking light are in effect a secondary image that mixes with the rays 30 of the primary image to prevent the primary image from being viewed.

The secondary image or mask of light consists of a single narrow range of wavelengths that is not one of the wavelengths used to generate the primary image. In addition, it is preferred that the range of wavelengths of the mask of light be sufficiently separated from the wavelength spectrum of the primary image. A sufficient separation between the primary and secondary wavelength spectrums will ensure that absorption of the mask of light by the filter will not substantially distort the primary image passed by the filter. The purpose of the separation is to minimize as much as possible the absorption of any wavelength components of the primary image that are within the absorption band of the filter. Therefore, it is desirable to have a filter that is well matched to the spectrum of the masking light.

Such a filter may be built into a pair of eyeglasses worn by a viewer, or clipped onto an existing pair of eyeglasses. In addition, this technique can be used to view both color and monochrome images. In an alternative embodiment, the absorption band of the filter may be adjustable, such as with a liquid crystal type filter. In this embodiment, it is possible to provide selectivity by the user of the wavelength band of the masking light. The filter is then electronically coupled to the control means which automatically changes the signals from control means to the filter so that the absorption band can be automatically adjusted to match the selected masking wavelength. The ability to change wavelengths will provide flexibility in security.

Figure 2:
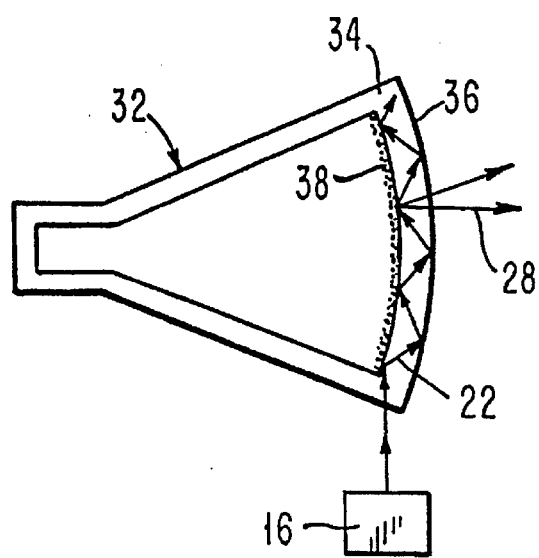
FIG. 2 is a schematic of a cathode ray tube having the secure viewing display system of the present invention.

In an alternative embodiment shown in FIG. 2, a cathode ray tube 32 is modified to provide a space 34 between the cover plate 36 and the phosphorus screen 38 into which the light 22 is introduced to generate the masking light 28. In this embodiment, the separate sheet of material 12 is unnecessary, but all other elements including the control means 16 and filter 14 are required.

The security means of the present invention is disposed between the display and the viewer, which ensures that no one else can see the display except for the person having a filter with an absorption band that matches the wavelength band of the masking light. The separation of the primary and secondary images in the present invention is by wavelength matching. This security feature is easily disabled by turning off the masking light, and such a switch function can be easily provided with the control means 16. Therefore, where security is no longer required, the user need not use the special filter to view the primary image.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and desired to be secured by Letters Patent is:

1. An apparatus for providing secure viewing of a primary image on a display by a viewer comprising:

means for generating a mask of light of a single wavelength band between said display and said viewer that mixes with said primary image to obscure viewing of said primary image; and viewing means for use by the viewer for separating said mask of light from said primary image to allow only the primary image to be viewed through the viewing means, so that the viewer only sees the primary image.

2. The apparatus of claim 1 wherein said means for generating a mask of light includes a transparent screen disposed between the display and the viewer and a guide means for introducing said mask of light into the interior of said screen such that said mask of light mixes with and obscures the primary image.

3. The apparatus of claim 1 wherein said means for generating a mask of light includes a variable control means for varying the wavelength band of the mask of light.

4. The apparatus of claim 1 wherein said viewing means includes a filter adapted to absorb light of the wavelength band of said mask of light.

5. The apparatus of claim 4 wherein the wavelength band of said mask of light is sufficiently separated from the wavelength spectrum of said primary image such that absorption of said mask of light does not substantially distort the primary image passed by said filter.

6. An apparatus of claim 4 wherein said filter is comprised of eyeglass lenses to be worn by the viewer.

7. The apparatus of claim 6 wherein said lenses are adapted to clip onto clear lens eyeglasses.

8. The apparatus of claim 2 wherein said screen is provided between a cover plate and display of a cathode ray tube.

9. The apparatus of claim 2 wherein said screen includes a front and back surface between which is defined the interior of the screen, said mask of light traveling through the interior of the screen such that a fraction of the light escapes through the front surface and mixes with the primary image to obscure viewing of the primary image.

* * * * *